F. L. POPE & T. A. EDISON.
Assignors, by mesne assignments, to THE GOLD AND STOCK TELEGRAPH COMPANY.
PRINTING TELEGRAPH.
No. 10,542. Reissued Dec. 9, 1884.
Fig. 1,
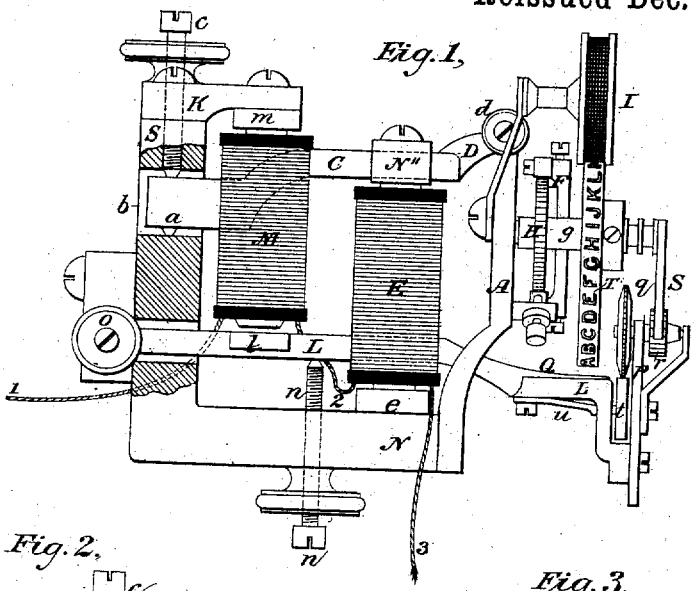
Fig. 2,
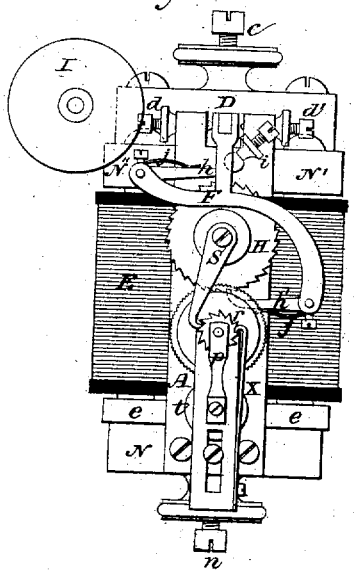
Fig. 3.
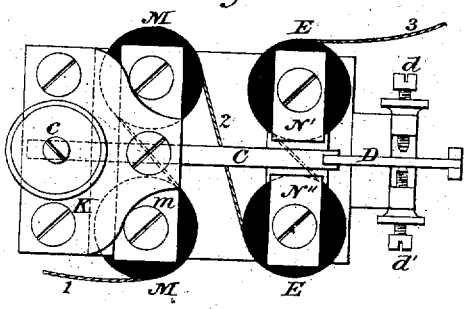
Fig. 4,
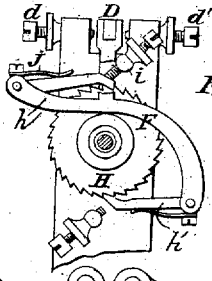
Fig. 5,
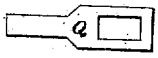
Fig. 6,
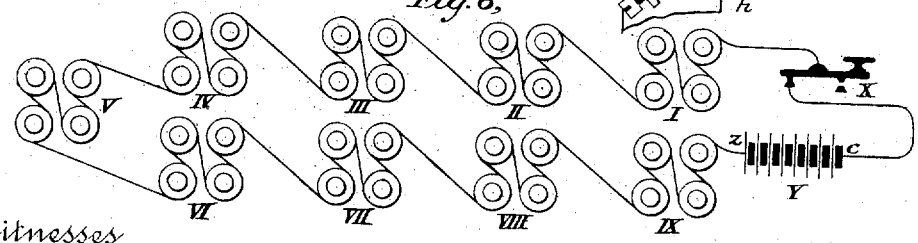
Witnesses
Geo. W. Breck
C. E. Ashley
By their Attorney
Inventors
Frank L. Pope,
Thomas A. Edison
C. L. Buckingham

UNITED STATES PATENT OFFICE.

FRANK L. POPE, OF ELIZABETH, AND THOMAS A. EDISON, OF MENLO PARK, NEW JERSEY, ASSIGNORS, BY MESNE ASSIGNMENTS, TO THE GOLD AND STOCK TELEGRAPH COMPANY, OF NEW YORK, N. Y.

PRINTING-TELEGRAPH.

SPECIFICATION forming part of Reissued Letters Patent No. 10,542, dated December 9, 1884.

Original No. 102,320, dated April 26, 1870; Reissue No. 7,621, dated April 17, 1877. Application for reissue filed November 12, 1884.

*To all whom it may concern:*

Be it known that we, FRANK L. POPE, of Elizabeth, in the county of Union, and THOMAS A. EDISON, now of Menlo Park, in the county of Middlesex, both in the State of New Jersey, have invented certain new and useful Improvements in Printing-Telegraphs, which improvements are fully set forth in the following specification, reference being had to the accompanying drawings.

Our invention relates to that class of printing-telegraph instruments in which the type-wheel is caused to rotate by means of a step-by-step escapement actuated or controlled by the armature of an electro-magnet in the main circuit, and when any desired character upon the type-wheel has been brought round to a given point an impression of such character may be printed by bringing into action a second armature controlled by the same circuit.

Our improvements consist, first, of a polarized electro-magnet for imparting to the type-wheel of a printing-telegraph an intermittent rotary motion by the action of successive alternate positive and negative currents of short duration, and of locking the type-wheel at any point, and at the same time printing a letter or character by prolonging the duration of the final current, whether the same is positive or negative, through a neutral electro-magnet in the same circuit; second, in the combination of a type-wheel actuated or controlled by a polarized armature under the influence of alternate reverse currents of short and uniform duration with a device for giving the impression, which is actuated or controlled by a non-polarized or neutral armature, said polarized and neutral armatures being operated by electro-magnets placed in the same line, the arrangement being such that the type-wheel may be locked, and the neutral armature brought into action to effect the printing, when the type-wheel has been brought to the required point, by prolonging the duration of the final current without reference to its polarity; third, in certain improved combinations of the mechanism of the several parts of the apparatus, whereby the efficiency and reliability of its action are materially increased.

In the accompanying drawings, Figure 1 is a side elevation of the receiving apparatus. Fig. 2 is an end elevation of the same, the type-wheel being removed. Fig. 3 is a plan view of a portion of said apparatus. Fig. 4 is a detached view, showing the details of the escapement in said apparatus. Fig. 5 is a plan view of the slotted presser; and Fig. 6 is a skeleton diagram, showing the arrangement of a number of instruments located at different stations and placed in the same electric circuit, operated simultaneously in unison by a battery placed at one point in the circuit.

Similar letters refer to like parts in the different figures.

E, Figs. 1, 2, and 3, designates a perpendicular electro-magnet, composed of two cores of soft iron united below in the ordinary manner by a cross-bar, *e*, also of soft iron. The north pole of an angular-bent permanent magnet, N S, is screwed to the cross-bar *e*, to which it communicates north polarity beyond the point of contact, and also to both cores and poles of the electro-magnet E. The soft-iron armature C is supported upon a pivot, *a*, in a slot, *b*, in the south end, S, of the permanent magnet N S, from which it receives south polarity, being secured in that position by a screw or otherwise. The said slot is situated at a short distance from the end of the magnet, exactly at the point of greatest magnetic intensity, so that the pivot end of the armature is completely surrounded by the magnetic mass, and becomes subject to the greatest possible amount of inductive influence.

The armature C is so placed that it is free to vibrate to and fro in a lateral direction between the poles N′ and N″ of the electro-magnet E. When this is arranged, it is obvious that the north polarized ends, N′ and N″, will each exert an equal attraction upon the south polarized armature, C, when the same is equidistant from each, but that it will be attracted and firmly held by either N′ or N″ when placed in close proximity or contact with one or the other. An arm, D, projects from the end of the armature C, passing between screw-stops *d* and *d′*, by means of which its lateral vibration is controlled and limited. This arm is constructed of brass or other non-magnetic metal in order to prevent the inductive magnetic action from extending beyond the poles N′ N″ of the electro-magnet E.

The screw-stops *d* and *d′* are supported by a brass standard, A. Upon this standard is secured a shaft, *f*, Fig. 4, upon which is a sleeve, *g*, carrying a ratchet-wheel, H, and a type-wheel, T, upon the circumference of which type-wheel are engraved such letters, numerals, or other characters as may be required. The characters on the type-wheel are supplied with ink by means of a fountain ink-roller, I, secured to a movable arm attached to the standard A. The vibrating arm D carries a curved bar, F, to the extremities of which are pivoted pawls *h* and *h′*, which act, respectively, at opposite points upon the circumference of the ratchet-wheel H, as shown in Figs. 2 and 4.

The to-and-fro movement of the pawls, as well as each successive step in the forward movement of the wheel H, which is driven by them, is limited by the adjustable screw-stops *i* and *i′*. The pawls are pressed against the teeth of the wheel by springs *j j′*, and when the arm D vibrates to and fro the pawls alternately fall into the interdental spaces of the wheel H and push it forward until the movement of the pawl, and consequently that of the wheel, also, is adjusted by the stops *i* and *i′*, which may be adjusted so as to allow of any desired amount of movement of the pawls *h* and *h′*; but we will here remark that the pawls *h* and *h′* may be made of spring-steel, and so arranged as to automatically bear in the interdental spaces of the wheel H, in which case the springs *j j′* may of course be dispensed with.

By means of the above-described arrangement the to-and-fro vibrations of the arm D may be caused to communicate, through the pawls, a rapid intermittent rotary motion to the ratchet-wheel H, sleeve *g*, and type-wheel T in the direction shown by the arrow marked thereon. The screw-stops *d d′* are so adjusted in reference to the stops *i i′* that when the armature C is acted upon by a powerful current, tending to bend or otherwise to disarrange the pawls *h h′*, ratchet-wheel H, and their appurtenances, the slightest deflection of the arm D after the pawls *h* or *h′* have come in contact with the stops *i* or *i′* will bring said arm D against one of the stops *d* or *d′*, thereby relieving the mechanism from undue strain or pressure.

The manner in which the vibration of the armature C and arm D is made to revolve the ratchet-wheel H will be understood more clearly by reference to Fig. 4. Suppose the arm D to be moved from its position, as shown, toward the left, carrying with it the bar F and the pawls *h h′*. The pawl *h′* will engage with a tooth of the wheel H, and carry it forward in the direction of the arrow until its movement is arrested by the pawl coming in contact with the stop *i′*. At the same time the pawl *h* will slip over one tooth of the wheel without obstruction. When the arm D, bar F, and pawls *h h′* are moved from left to right, the operation of the respective pawls is reversed, although the wheel H continues to be moved in the same direction as before. Each vibration of the arm D, either to the left or to the right, therefore advances the ratchet-wheel H the distance of one tooth.

The apparatus for taking the impression after the type-wheel has been brought to the desired position may be described as follows: M, Figs. 1 and 3, is an electro-magnet of the usual form, its poles being united by the cross-bar *m*, which is secured by a lug, K, to the south end, S, of the permanent magnet N S. This lug is made of brass or any other non-magnetic metal, for the purpose of cutting off the magnetic induction which would otherwise take place between the permanent magnet N S and the soft-iron cores of the electro-magnet M. The armature *l* of this electro-magnet is of soft iron, and attached to a lever, L, one end of which is pivoted at O, and which passes through a slot in the standard A. The lever is capable of a vertical movement upon O as its fulcrum, the extent of such movement being limited in one direction by the face of the type-wheel T, and in the other by the adjustable screw-stop *n*.

To the extremity of the lever L is attached a slotted adjustable standard, *p*, carrying a wheel, *q*, with a sharp serrated edge. Upon the same shaft with said wheel *q* is a ratchet-wheel, *r*, actuated by a hook-shaped pawl, *s*, attached to the extremity of the type-wheel shaft *f*. A roller, *t*, of hard rubber or other suitable material, is mounted upon a spring-axle, *u*, in such a manner as to be pressed firmly against the serrated edge of the wheel *q*. A ribbon of paper (not shown in the drawings) may be made to pass horizontally across the lever L and beneath the slotted presser Q, (shown in plan in Fig. 5,) the edge of said paper passing between the serrated wheel *q* and the roller *t* in such a manner that the rotation of the wheel *q* will cause the ribbon to be drawn forward from right to left. The slotted presser Q serves to keep the paper from coming in contact with any portion of the type-wheel, except the letter of which the impression is desired. The two electro-magnets E and M are placed in the same electrical circuit, the connections being arranged as shown in Fig. 3.

The manner in which the above-described apparatus is actuated by means of electric currents is as follows: If a momentary current of electricity be sent from the positive pole of a battery through the electro-magnets E and M, its tendency would be to magnetize the pole N′ of the electro-magnet E "north" and the pole N″ "south;" but as both poles were previously north by the inductive influence of the permanent magnet N S, the effect of this current is to strengthen the north magnetism of N′ and to weaken or entirely destroy that of N″. The armature C is therefore attracted to N′ with double force, and remains on that side after the cessation of the current, being still attracted by the pole N′, whose distance from C is now much less than that of N″. If, now, a momentary negative current is sent, this effect is reversed. The pole N″ in turn attracts the armature, and it moves to that side, remaining until the polarity of the exciting-current is again changed. Thus by transmitting through the helices of the electro-magnet E a rapidly-alternating series of short positive and negative currents, it will readily be understood that the armature C and its attachments may be caused to vibrate to and fro with great rapidity, causing a correspondingly-rapid revolution of the ratchet-wheel H and the type-wheel T, and that the latter may readily be brought to any required position simply by transmitting in succession the requisite number of alternate positive and negative currents through the electro-magnet E. These alternate currents of short duration necessarily traverse the coils of the electro-magnet M, which is included in the same circuit, but the armature of the latter is not affected by them. The reason of this is that a polarized or permanently magnetic armature responds much more promptly to the attraction of an electro-magnet than a non-polarized or neutral armature, other conditions being the same, and therefore the polarized armature C of the magnet E responds perfectly to the short alternate currents, while the more sluggish non-polarized or neutral armature *l* of the magnet M remains at rest. In order, therefore, to print an impression of any desired character upon the type-wheel, a succession of alternate positive and negative currents is sent through the wire 1 2 3, Figs. 1 and 3, of such short duration as not to affect in any manner the neutral armature *l* of the electro-magnet M, while, by the action of the polarized armature C of the electro-magnet E, the type-wheel T may be revolved until the desired character upon its circumference is brought opposite the impression-lever L. The duration of the final current is then prolonged, the effect of which prolongation is to cause the type-wheel to be firmly locked in its position, (the pawl *h* or *h′* being wedged between the point of the stop *i* or *i′* and a tooth of the wheel H,) and to allow sufficient time for the neutral armature *l* of the electro-magnet M to act, which raises the lever L, and brings the paper ribbon in contact with the type upon the wheel T, the same having been previously inked by the fountain-roller I. The armature *l* being of soft iron and neutral, it is immaterial, so far as the result is concerned, whether the prolonged terminal current is positive or negative, as it responds with equal certainty in either case. When the attraction of the electro-magnet M ceases, the lever L falls back to its original position. At the same time the hooked pawl *s* catches a tooth of the ratchet-wheel *r*, and causes it, together with the wheel *q*, to revolve a short distance, thus drawing the paper ribbon forward and leaving a clear space in readiness for the next impression. A click, *x*, prevents the ratchet-wheel *r*, and consequently the wheel *q*, from revolving in the opposite direction. The downward movement of the lever L may be assisted by a retracting-spring, if necessary.

It will be understood from the above description that this apparatus is actuated entirely by electro-magnetic power derived from the battery at the transmitting-station without the assistance of local or secondary batteries, or of mechanical power derived from any source other than the said battery at the said transmitting-station, and that any required number of such apparatus may be placed at various points included in the same electric circuit, and operated simultaneously in unison by the action of a single battery placed at the transmitting-station. This will be more clearly understood by reference to Fig. 6, where we have given a skeleton diagram illustrating an arrangement of instruments in connection with a main battery and circuit-breaker, whereby an operator can at one point form a connection with a main battery, so as to complete an electric circuit in such manner that the current of said battery shall pass through as many instruments on a main line unprovided with local batteries as desired, and record simultaneously in printed characters at each instrument the same message. For instance, at a point lettered X, there may be located a circuit-breaker of any suitable construction, and at the point lettered Y a main battery of sufficient power, or in lieu thereof a number of small main batteries, located at such point or elsewhere in the main circuit that a current may be caused to pass from the main battery or batteries through the electro-magnets of instruments I II III, &c.; hence it will be understood without further explanation that a communication may be printed simultaneously at as many different stations as may be desired without the use of local batteries or of mechanism—such, for instance, as weights or springs—for operating each instrument. In such cases the action of such local batteries or mechanism is simply controlled by the action of the main electrical circuit.

It is obvious that another electro-magnet can be placed in the same circuit for effecting other useful purposes—such as striking a bell to call attention, &c.—which may be actuated by increasing the strength of the electric current which operates the printing mechanism.

We do not confine ourselves to the particular form and arrangement of parts shown in the drawings. There are numerous and well-known means of producing the vibratory movement of a lever by the use of alternate positive and negative currents, in combination with a permanent and an electro magnet acting upon each other, and of applying the same to the movement of a type-wheel. Neither do we wish to confine ourselves to any particular method of producing or transmitting alternate positive and negative currents for the purpose specified, as there are many well-known appliances for these purposes, which have heretofore been used in connection with other printing-instruments, and may be employed in like manner with advantage in connection with our improved apparatus.

We are aware that others have heretofore employed a polarized electro-magnet and a neutral electro-magnet in the same circuit, one to control the rotation of the type-wheel by short impulses and the other the operation of the press mechanism by strengthening the short impulses. Our invention, however, is different from the foregoing, in that the press mechanism is operated by prolonging rather than by strengthening an impulse, thus enabling the dispensing of extra battery to effect printing.

We claim as our invention—

1. The combination of a polarized electro-magnet whose armature is operated by alternate positive and negative currents of short duration with a neutral electro-magnet placed in the same circuit whose armature communicates its power directly to the printing-lever and is actuated by prolonged impulses of either polarity, and a type-wheel actuated or controlled by said polarized electro-magnet, substantially as and for the purpose described.

2. The combination of a polarized electro-magnet whose armature is operated by alternate positive and negative currents with a neutral electro-magnet placed in the same circuit whose armature is actuated by prolonged impulses of either polarity, a type-wheel actuated or controlled by said polarized electro-magnet, and a press mechanism actuated or controlled by said neutral electro-magnet, the whole being arranged for operating a printing-telegraph by first moving the type-wheel into any required position by the action of the alternate positive and negative currents of short and uniform duration, and then locking the type-wheel in such position, and at the same time causing the printing to be effected by prolonging the duration of the current last sent irrespective of its polarity, substantially as described.

3. A type-wheel actuated or controlled by the to-and-fro movements of a polarized armature under the influence of alternate positive and negative currents of short duration, in combination with an impression device actuated or controlled by a neutral armature which is under the direct magnetic influence of the same alternate positive and negative currents of short duration, but which is not actuated thereby, when the arrangement is such that the type-wheel is locked at any required character, and the neutral armature brought into action to effect the printing of such character by one of the said alternate currents when sufficiently prolonged, whether positive or negative.

4. The combination of the safety-stops *d d'*, with the stops *i i'*, escapement-pallets *h h'*, and the armature-lever D, substantially as and for the purpose specified.

FRANK L. POPE.
THOMAS A. EDISON.

Witnesses:
WM. ARNOUX,
C. L. BUCKINGHAM.